US010296946B2

United States Patent
Luk (10) Patent No.: US 10,296,946 B2
(45) Date of Patent: May 21, 2019

(54) AUDIENCE USAGE PATTERN ANALYSIS

(71) Applicant: Amobee, Inc., Redwood City, CA (US)

(72) Inventor: Sherman Luk, Palo Alto, CA (US)

(73) Assignee: Amobee, Inc., Redwood City, CA (US)

(*) Notice: Subject to any disclaimer, the term of this patent is extended or adjusted under 35 U.S.C. 154(b) by 0 days.

(21) Appl. No.: 14/140,161

(22) Filed: Dec. 24, 2013

(65) Prior Publication Data

US 2015/0178781 A1    Jun. 25, 2015

(51) Int. Cl.
*G06Q 30/02*    (2012.01)

(52) U.S. Cl.
CPC ..... *G06Q 30/0267* (2013.01); *G06Q 30/0201* (2013.01)

(58) Field of Classification Search
CPC ............... G06Q 30/02; G06Q 30/0201; G06Q 30/0205; G06Q 30/0241; G06Q 30/0255; G06Q 30/0269
See application file for complete search history.

(56) References Cited

U.S. PATENT DOCUMENTS

| 8,135,777 | B2* | 3/2012 | Colligan et al. ............... 709/203 |
| 8,239,522 | B1  | 8/2012 | Luby et al. |
| 2003/0204536 | A1* | 10/2003 | Keskar .................... G06F 9/451 |
| 2007/0011039 | A1  | 1/2007 | Oddo |
| 2007/0077925 | A1* | 4/2007 | Hiyama .................. H04M 1/66 455/420 |
| 2008/0046888 | A1* | 2/2008 | Appaji .................. G06F 9/4843 718/102 |
| 2008/0242286 | A1* | 10/2008 | Appaji .............. H04M 1/72586 455/418 |
| 2010/0041391 | A1* | 2/2010 | Spivey .................. H04W 12/10 455/425 |
| 2010/0094930 | A1* | 4/2010 | Griff ..................... H04W 24/10 709/203 |
| 2011/0238496 | A1* | 9/2011 | Gurbuxani et al. ....... 705/14.49 |
| 2012/0110062 | A1* | 5/2012 | Savage ................... H04L 43/04 709/203 |
| 2012/0130806 | A1* | 5/2012 | Partridge ........... G06Q 30/0251 705/14.49 |
| 2013/0036165 | A1* | 2/2013 | Tseng ..................... G06Q 30/02 709/204 |
| 2013/0080910 | A1* | 3/2013 | Bingell .................. G06F 3/048 715/744 |

(Continued)

*Primary Examiner* — Sam Refai
*Assistant Examiner* — Kyle G Robinson
(74) *Attorney, Agent, or Firm* — Kwan & Olynick LLP (57) ABSTRACT

Techniques and mechanisms described herein facilitate the performance of advertising audience usage pattern analysis. According to various embodiments, a data collection configuration message may be received at a mobile computing device from a configuration server via a network. The data collection configuration message may include a first instruction for identifying data at the mobile computing device and a second instruction for analyzing data collected at the mobile computing device. Data identified based on the first instruction may be analyzed to generate analyzed data via a processor at the mobile computing device. The analysis may be conducted in accordance with the second instruction. The analyzed data may include an indication of a usage pattern associated with the mobile computing device.

11 Claims, 6 Drawing Sheets

(56) References Cited

U.S. PATENT DOCUMENTS

2013/0204999 A1* 8/2013 Lindberg .............. H04L 41/142
                                                        709/223
2013/0212638 A1* 8/2013 Wilson ............................. 726/1
2013/0275416 A1* 10/2013 Thomson ......... G06Q 10/06393
                                                        707/723

* cited by examiner

AUDIENCE USAGE PATTERN ANALYSIS

TECHNICAL FIELD

The present disclosure relates generally to audience usage pattern analysis and more specifically to configurable logic for advertisement audience data collection, analysis, and transmission on client devices.

DESCRIPTION OF RELATED ART

In online advertising, computing device users are presented with advertisements as they browse the internes using a web browser or use web-enabled applications. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are presented on a daily basis. Advertisers often try to use ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

Advertisers may prefer to target a particular group of end users when presenting an advertisement as part of an advertising campaign. Advertisers may be faced with a very large number of options when selecting between different groups of end users. Providing advertisements to different groups of end users may be associated with different advertising costs and provide different rates of return to advertisers.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for the performance of advertising audience usage pattern analysis. According to various embodiments, a data collection configuration message may be received at a mobile computing device from a configuration server via a network. The data collection configuration message may include a first instruction for identifying data at the mobile computing device and a second instruction for analyzing data collected at the mobile computing device. Data identified based on the first instruction may be analyzed to generate analyzed data via a processor at the mobile computing device. The analysis may be conducted in accordance with the second instruction. The analyzed data may include an indication of a usage pattern associated with the mobile computing device.

According to various embodiments, the data collection configuration message may be processed with a configuration engine at the mobile computing device to identify the first instruction. The configuration engine may be operable to designate data to identify at the mobile computing device based on information received from the configuration server. The identified data may include the designated data.

According to various embodiments, the data collection configuration message may be processed with a configuration engine at the mobile computing device to identify the second instruction. The configuration engine may be operable to designate an analysis procedure for analyzing data identified at the mobile computing device. The identified data may be analyzed via the designated analysis procedure.

In some implementations, analyzing the data identified based on the first instruction may include assigning one or more relevancy scores to the identified data. Each relevancy score may indicate the applicability of a data element to the indicated usage pattern.

According to various embodiments, the identified data may include a plurality of data elements. Each of the data elements may be related to a usage characteristic. The usage characteristic may be indicative of the usage pattern. The usage pattern may indicate a preference, characteristic, or behavior pattern exhibited by a user associated with the mobile computing device. At least a portion of the collected data and at least a portion of the analyzed data may be stored on a storage component at the mobile computing device.

In some embodiments, the data collection configuration message may include a third instruction for transmitting data from the mobile computing device. A data description message may be transmitted to a data aggregation server via the network in accordance with the third instruction. The data description message may include at least a portion of the identified data and/or the analyzed data.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular techniques and mechanisms related to advertising campaigns. However, it should be noted that the techniques and mechanisms of the present invention apply to a variety of different computing techniques and mechanisms. In the following description, numerous specific details are set forth in order to provide a thorough understanding of the present invention. Particular example embodiments of the present invention may be implemented without some or all of these specific details. In other instances, well known process operations have not been described in detail so as not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein facilitate mobile audience analysis. An advertising data collection engine or interpreter may be implemented on a mobile device. The engine may be configured to dynamically identify data to aggregate and process. Based on the collected data, the engine may generate a behavior map of a user of the device. A configuration server may communicate with the engine to guide the data collection and analysis process. The mobile device may transmit data to a data aggregation server for aggregation and/or further analysis.

Example Embodiments

In recent years, the amount of advertisements served via a network such as the internet has experienced a tremendous growth. For instance, RTB exchanges provide a technology for advertisers to algorithmically place a bid on any individual impression through a public auction. Advertising functionality allows advertisers to buy inventory in a cost effective manner and to serve ads to the right person in the right context at the right time. However, in order to realize such functionality, advertisers need to intelligently evaluate the audience to which advertisements are provided.

The placement of online advertisements may be facilitated by advertisement management systems that connect advertisers with an advertisement audience. For example, an advertisement management system may place advertisements on websites viewable via a web browser. As another example, an advertisement management system may place advertisements for presentation in network-connected applications such as mobile applications.

In order to place advertisements effectively, advertisements may be targeted based on audience. Audience targeting may involve identifying and describing one or more characteristics associated with an audience. For instance, demographic information, advertisement viewing information, and/or product purchasing information associated with an audience may be collected and aggregated to identify an audience for advertisement placement.

According to various embodiments, data collection and analysis techniques described herein may facilitate the analysis of user behavior and usage patterns on client devices such as mobile devices. The data collection and analysis techniques may allow the formulation of inferences regarding the demographics, preferences, actions, and choices associated with the audience within a designated advertising context. For instance, a score may be assigned to one or more user attributes based on factors such as data relevancy for a particular usage pattern or behavior. Aggregated scores from different data sets may be used to form a model of user usage patterns and behaviors.

According to various embodiments, techniques and mechanisms described herein may facilitate flexible data collection, analysis, and transmission. For instance, the techniques and mechanisms may be used in conjunction with different types of advertising contexts. An advertising context may include, for instance, an application installed on a client device or a website visited by a client device. In these various contexts, logic configured in accordance with techniques and mechanisms described herein may be implemented on the client device to configure and implement audience data collection, analysis, and transmission at the client device.

In one example, an application configured to present advertisements received via a network may be installed on a client device. In this case, logic for configuring and implementing audience data collection, analysis, and transmission at the client device may be incorporated into the application, for instance as a computer code module linked with the application.

In another example, a web browser at a client device may visit a website or other network address. In this case, logic for configuring and implementing audience data collection, analysis, and transmission at the client device may be transmitted to the client device, for instance as a JavaScript module.

According to various embodiments, techniques and mechanisms described herein may support the configurable selection and arrangement of criteria and instructions for identifying, analyzing, and transmitting audience data at a client device. For example, different audience data may be relevant in different advertising contexts. As another example, one type of audience data may have one meaning or relevance in one advertising context and a different meaning or relevance in another advertising context.

In particular embodiments, a client device may include an engine such as an interpreter or compiler configured to process instructions for identifying, processing, and transmitting audience data. In this way, the same or similar configuration of code may be used to perform audience data collection, analysis, and/or transmission differently in different contexts. For instance, a configuration server may transmit instructions for performing audience data collection, analysis, and/or transmission to a client device. The engine at the client device may then process the instructions to formulate logic for executing the instructions.

According to various embodiments, techniques and mechanisms described herein may facilitate the intelligent storage and transmission of data from a client device. For instance, at least a portion of data collected at the client device may be stored for subsequent analysis. Data may be analyzed at the client device, and transmitted to a remote server when instructed.

In particular embodiments, the total amount of data transmitted by the client device may be reduced. By storing, aggregating, and analyzing data at the client device, the client device may prepare a more concise set of data for transmission to a remote server. For example, some data may be summarized and/or ignored based on instructions such as relevance criteria.

In particular embodiments, criteria related to data factors such as frequency, recency, and aging may be designated to govern the storage, analysis, and transmission of data. For example, data may be stored for a designated period of time and deleted after it is no longer useful. As another example, data may be transmitted to a remote server with a designated frequency.

According to various embodiments, privacy protection may be incorporated into the data collection and analysis techniques. For example, the sending or release of private data to a third party data collector over a network may be avoided. As another example, users may be able to configure a level of participation in the data collection and analysis process. For instance, users may be able to opt out of one or more portions of the data collection and analysis or specify a level of granularity that governs participation.

In particular embodiments and/or in some instances, performing at least some data analysis on a device may provide one or more of various advantages. For example, the sending of at least some sensitive data over a network may be avoided by analyzing the sensitive data on the device itself As another example, the sporadic sending of key/value data pairs to the server from a device may be avoided since analysis may aggregate the data and reduce the amount of data to be sent. As yet another example, at least some old data may be retained on the device, for instance to guide subsequent data collection and analysis. As still another example, the device may store persistent information for various reasons, for instance in a model similar to the use of cookies by web browsers.

In some implementations, techniques and mechanisms may be described herein as solving "optimization" problems or as "optimizing" one or more parameters. It should be noted that the term optimize does not imply that the solution determined or parameter selected is necessarily the best according to any particular metric. For instance, some optimization problems are computationally intense, and computing the best solution may be impractical. Accordingly, optimization may involve the selection of a suitable parameter value or a suitably accurate solution. In some instances, the suitability of a parameter value or solution may be strategically determined based on various factors such as one or more computing capabilities, problem characteristics, and/or time constraints.

Figure 1:
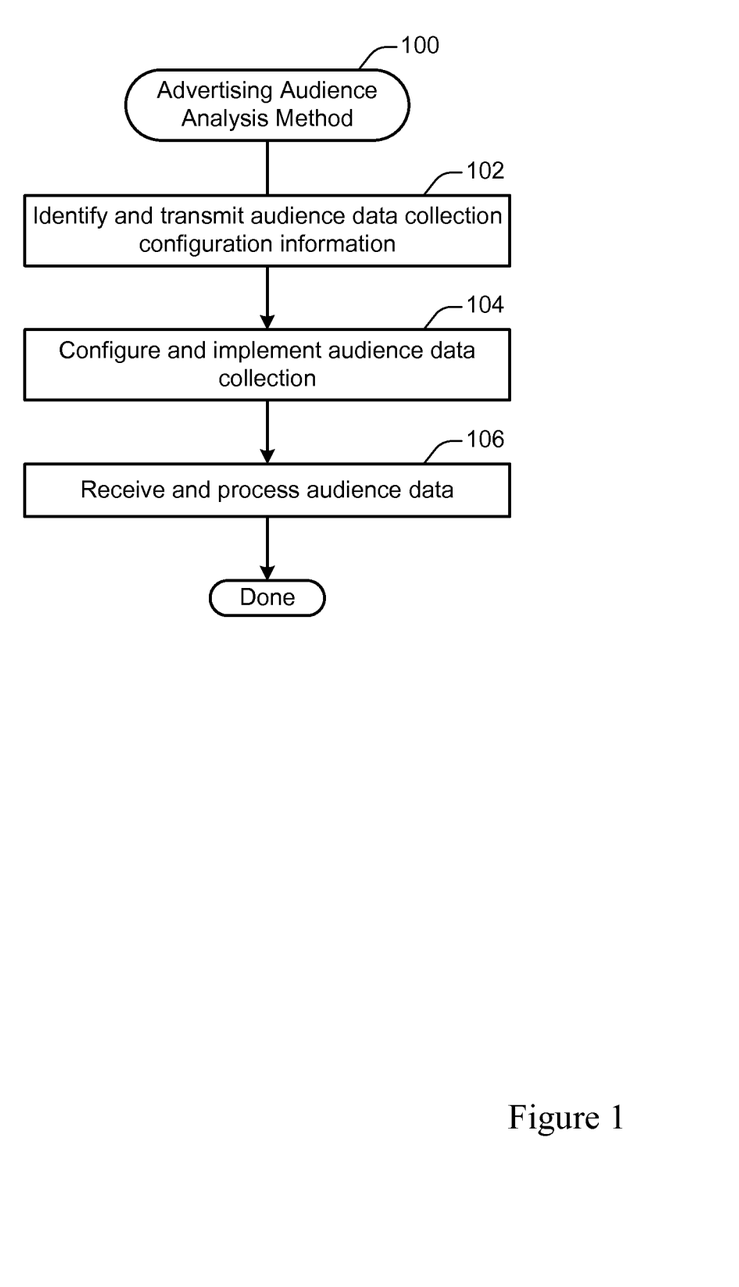
FIG. 1 illustrates an example of advertising audience analysis method, performed in accordance with one or more embodiments.

FIG. 1 illustrates an example of advertising audience analysis method 100, performed in accordance with one or more embodiments. The method 100 may be used to configure and implement a computer programming language for audience data collection and analysis. For instance, operations discussed with respect to the method 100 may be performed at a client device in communication with an advertisement audience system and/or at an advertisement audience analysis system in communication with one or more client devices. An example of a client device and an advertisement audience analysis system in communication is shown in FIG. 2.

At 102, audience data collection configuration information is identified and transmitted. In some implementations, the audience data configuration information may describe one or more operations and/or criteria for performing audience data collection. For example, the audience data configuration information may include one or more instructions for data collection to be performed at a client device. As another example, the audience data configuration information may include one or more criteria for data to be collected at a client device. As yet another example, the audience data configuration information may include an indication of one or more techniques to be used in processing data that is collected at a client device.

In particular embodiments, the configuration data may be transmitted to a client device, for instance as byte code. At the client device, the configuration data may be processed further, as discussed with respect to operation 104.

Figure 2:
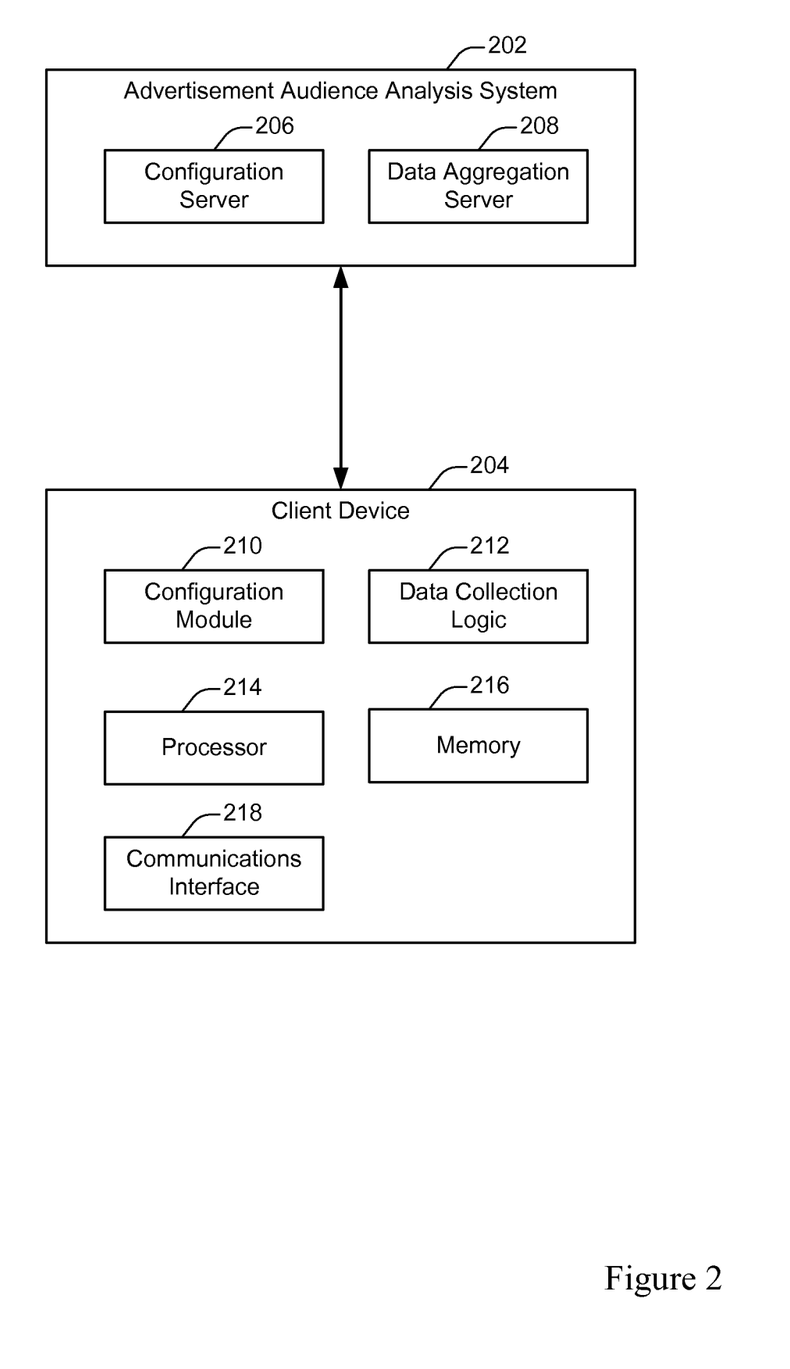
FIG. 2 illustrates an example of an advertisement audience analysis system in communication with a client device, configured in accordance with one or more embodiments.

In particular embodiments, the identification and transmission of audience data collection configuration information may be performed on a remote server such as the configuration server 206 shown in FIG. 2. Techniques for identifying and transmitting audience data collection configuration information are discussed in further detail with respect to FIG. 2 and the method 300 shown in FIG. 3.

At 104, audience data collection is configured and implemented. According to various embodiments, audience data collection configuration may include operations such as receiving and processing the audience data collection configuration information identified and transmitted in operation 202. The implementation of audience data collection may involve operations such as identifying audience data information, analyzing and/or storing the identified information, and transmitting information to a remote server such as the data aggregation server 208 shown in FIG. 2.

In particular embodiments, audience data collection configuration and implementation may be performed at a client device such as the client device 204 shown in FIG. 2. Techniques for configuring and implementing audience data collection are discussed in further detail with respect to FIG. 2 and the method 400 shown in FIG. 4.

At 106, audience data is received and processed. Receiving and processing audience data may include operations such as aggregating, analyzing, and storing audience data. For example, audience data may be received from a client device and then combined with existing audience data associated with the client device or a user associated with the client device. As another example, audience data associated with different client devices and/or users may be aggregated and analyzed, for instance to draw inferences about the advertising audience. As yet another example, audience data may be stored on a storage device for subsequent retrieval and/or processing.

In particular embodiments, the audience data may be received and processed by a remote server such as the data aggregation server 208 shown in FIG. 2. Techniques for receiving and processing audience data are discussed in further detail with respect to FIG. 2 and the method 500 shown in FIG. 5.

FIG. 2 illustrates an example of an advertisement audience analysis system 202 in communication with a client device 204, configured in accordance with one or more embodiments. The advertisement audience analysis system 202 includes a configuration server 206 and a data aggregation server 208. The client device 204 includes a configuration module 210, data collection logic 212, a processor 214, memory 216, and a communications interface 218.

According to various embodiments, the advertisement audience analysis system 202 is configured to communication with one or more client devices such as the client device 204. The system 202 may perform operations such as providing advertisements for presentation on the client device 204, configuring the audience data collection procedures on the client device 204, and aggregating and analyzing audience data collected by the client device 204.

The example system 202 is shown as including a configuration server 206 and a data aggregation server 208. In some implementations, these servers may be implemented on the same physical device. Alternately, the servers may be implemented on different physical devices. In particular devices, an advertisement audience analysis system may include potentially many different configuration servers and/or data aggregation servers, for instance to manage interactions with potentially many different client devices.

In some implementations, the configuration server 206 may be operable to identify information for configuring the client device 204. For example, the configuration information may be determined at least in part based on user input such as input provided by a system administrator or an advertiser. As another example, the configuration information may be determined at least in part automatically based on information such as what types of data are needed for analysis. Techniques for identifying information for configuring the client device 204 are discussed in further detail with respect to the method 300 shown in FIG. 3.

According to various embodiments, the data aggregation server 208 may be operable to receive, aggregate, and/or analyze audience data transmitted from the client device 204. For instance, the data aggregation server 208 may have access to storage systems for storing and retrieving audience data. Techniques for receiving, aggregating, and analyzing audience data are discussed in further detail with respect to the method 500 shown in FIG. 5.

According to various embodiments, the client device 204 may be any computing device in direct or indirect communication with the advertisement audience analysis system 202. For example, the client device 204 may be a mobile device such as a table computer, mobile telephone, or laptop computer. As another example, the client device 204 may be a computing device such as a personal computer.

The configuration module 210 at the client device may be operable to process configuration information. For instance, configuration information may be received from a remote server such as the configuration server 206. The configuration module 210 may be implemented as an engine or interpreter operable to process the configuration information to update the data collection logic 212.

The data collection logic 212 may be configured to perform one or more data collection and/or processing tasks at the client device 204. For example, the data collection logic 212 may identify information to collect at the client device. As another example, the data collection logic 212 may store raw or processed data at the client device for subsequent transmission and/or processing. As yet another example, the data collection logic 212 may designate information for transmission to a remote server such as the data aggregation server 208. Techniques for configuring data collection and for collecting, processing, and transmitting data at the client device 204 are discussed in further detail with respect to the method 600 shown in FIG. 6.

The client device 204 may also include a processor 214, memory 216, and a communications interface 218. The processor and memory may be any components suitable for performing computational operations and storing information on the client device 204. The communications interface 218 may be any communications interface suitable for facilitating communications with the advertisement audience analysis system 202. For instance, the communications may be conducted via wireless communication, satellite communication, wired communication, or any other type of communication technique. The communications may be transmitted via one or more networks such as a cellular telephone network, a wide area network, a local area network, and/or the Internet.

Figure 3:
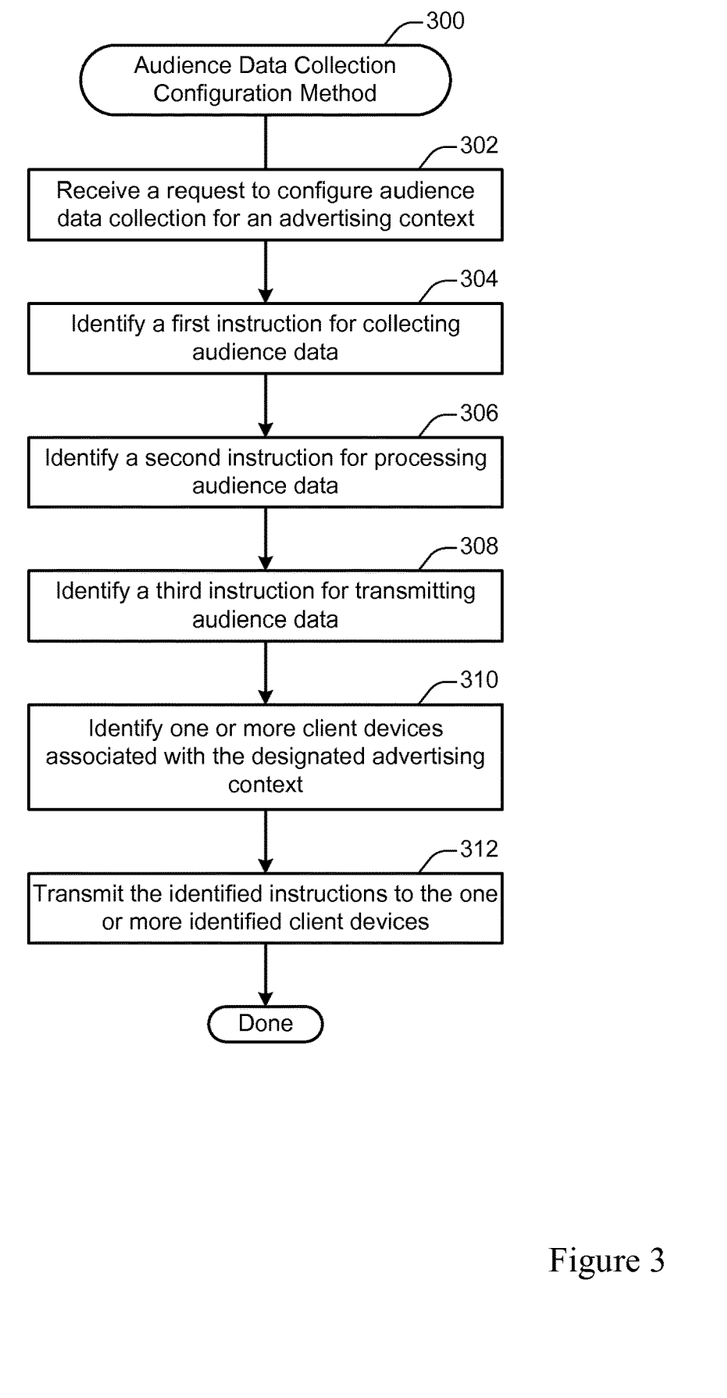
FIG. 3 illustrates an example of an audience data collection configuration method performed in accordance with one or more embodiments.

FIG. 3 illustrates an example of an audience data collection configuration method 300 performed in accordance with one or more embodiments. According to various embodiments, the method 300 may be performed at a configuration server associated with an advertisement audience data analysis system. For instance, the method 300 may be performed at the server 206 shown in FIG. 2.

At 302, a request to configure audience data collection for a designated advertising context is received. According to various embodiments, the designated advertising context may identify one or more criteria for implementing one or more instructions for audience data collection, processing, and transmission on client devices. For instance, the designated advertising context may identify a particular application, website, operating system, or other characteristic associated with one or more client devices. The designated advertisement context may simply specify that a client device is set up or configured with a particular feature, such as a particular application or operating system, or may specify that the client device perform a particular action, such as a web browser at a client device accessing a particular webpage.

Operations 304-306 relate to the identification of instructions for collecting, processing, and transmitting audience data. According to various embodiments, the instructions described with respect to operations 304-306 may be identified automatically and/or manually. For example, a user may be provided with a set of options from which to choose. As another example, the system may recommend one or more instructions based on estimated performance metrics. For instance, the configuration may be performed via an exposed interface at the configuration server.

At 304, a first instruction for collecting audience data is identified. According to various embodiments, the first instruction for collecting audience data may identify one or more criteria or categories for selecting audience to collect at a device. For instance, the device may be a mobile device, and the criteria or categories may identify information available to an application running on the mobile device.

According to various embodiments, a flexible data model may allow configuration changes in the data collected. For instance, the first instruction may include a data configuration map that may be transmitted to the client device. In some instances, logic implemented on the client device can use the configuration map to update the types of data collected at the client device based on the instruction without needing to update the logic itself.

In particular embodiments, the first instruction may designate one or more correlation groups. Each correlation groups may identify one or more types of data to collect. The types of data in a correlation group may be related by one or more common characteristics such as what type of information the data type is likely to reveal about a user of the device.

In particular embodiments, any of the data described as being included in a correlation group may be collected individually. Alternately, or additionally, any of the data described as being included in a given correlation group may be collected in conjunction with a different correlation group. In addition, the description of data associated with correlation groups in the following paragraphs is not exhaustive, and many other types of data may be collected in various implementations.

In a first example, a correlation group may include data related to location. According to various embodiments, location data may include, but is not limited to: geo-coordinate data (e.g., Global Positioning System (GPS)) data, home country code data, location granularity data (e.g., hyperlocal data, zip code data, city data, state data, country data), WiFi access point identification data, radio signal strength data, cell location data, source IP data, date and/or time data, and local weather data.

In particular embodiments, a data sample may be assigned a group-specific relevancy score. For instance, a data sample may be assigned a higher relevancy score for one correlation group than for another correlation group.

In a second example, a correlation group may include data related to mobile device characteristics. According to various embodiments, mobile device characteristic data may include, but is not limited to: mobile alternative ID (e.g., ODIN-1, Open UDID, Sub ID, IMEI, ESN, IFA, etc.), mobile carrier ID, device manufacturer, device model, device hardware capabilities, device software capabilities, and device operating system version.

In a third example, a correlation group may include data related to application usage. According to various embodiments, application usage data may include, but is not limited to: information describing applications installed on the device, information describing the genres of applications installed on the device, web usage statistics, native application usage statistics, and installed application usage statistics.

In a fourth example, a correlation group may include data related to mobile device communication. According to various embodiments, mobile device communication data may include, but is not limited to: a total number of SMS or MMS messages sent and/or received, a number of SMS or MMS messages sent and/or received in communication with users in an address book on the device, a number of phone calls made and/or received, and a number of phone calls made and/or received in communication with users in an address book on the device.

In a fifth example, a correlation group may include data related to media downloaded or consumed. According to various embodiments, media may include downloaded or streamed audio or video files, photographs, or any other type of media. Media data may include, but is not limited to: information characterizing downloaded media files, streamed media files, media genres, media artists, and photograph metadata.

In a sixth example, a correlation group may include data related to mobile device network usage. According to various embodiments, network usage data may include, but is not limited to: connection type data (e.g., 3G, 4G, WiFi), data usage statistics, roaming usage, wireless signal strength data, and cell location data.

In a seventh example, a correlation group may include data related to application events and actions. According to various embodiments, application event and action data may include, but is not limited to: information describing button clicks, selections, user input, sent emails, social networking actions, or other events that occur respect to an application.

At 306, a second instruction for processing audience data is identified. According to various embodiments, the second instruction may designate one or more operations for analyzing, storing, summarizing, or otherwise processing data available on the client device. For instance, the second instruction may include one or more operations related to data relevancy scoring, dynamic attribute and attribute set scoring, and/or usage pattern and behavioral mapping.

In particular embodiments, the second instruction may include one or more operations related to data relevancy scoring. Different data collected on the client device may have different levels of relevance for one or more usage or behavior patterns based on various factors. These factors may include, but are not limited to: the sampling frequency for the data, the availability of the data, the aging of the data, and the number of data samples collected.

According to various embodiments, the second instruction may designate a probability of data accuracy for a data value associated with a designated data type. Alternately, or additionally, the second instruction may identify a score for assigning to an attribute or set of attributes to form a specific pattern of device usage or behavior of an individual associated with the device.

In particular embodiments, an attribute can be applied to different usage patterns and behaviors. For instance, the same attribute may be associated a different relevancy factor and/or score dependent on the usage pattern or behavior it is used to model.

According to various embodiments, the second instruction may designate a technique for drawing an inference about the user of the device. For instance, the second instruction may include a combination of data types and scores for the data types associated with an inference. The types of inferences that may be drawn may include, but are not limited to: where the user works, a frequency of business or personal travel, whether the user is currently on vacation, the length of the user's commute, whether the user actively uses the device and/or is online when commuting, the frequency of the user's SMS and/or MMS usage.

In a particular embodiment, the second instruction may designate a technique for assigning a relevancy score to a particular data type. For instance, the second embodiment may designate a data type, one or more criteria for collecting a data sample associated with the data type, and one or more criteria for identify a relevancy score for the data type. The relevancy score may indicate a degree of applicability of a data element to a particular usage pattern. For instance, the relevancy score may depend on factors such as the age of the data used to formulate the relevancy score and the number of data samples available.

One example of a type of inference that may be drawn is the estimated location of a user's place of work. This inference may depend on various types of data collected at the device. The data used to draw this inference may include, but is not limited to, latitude and longitude information, cell location and signal strength information, WiFi access point identification information, source IP address information, a device country code, a device carrier ID, date and time information, frequency and recency of sampling data, and/or local weather data.

In this example, each data type may be assigned a relevancy score such as highest, high, medium, low, or lowest. For instance, data such as country code or carrier ID may be designated for collection a given number of times per day and assigned a relevancy score of "lowest" since such information may convey comparatively little information about the user's work location.

In this example, the relevancy of cell location and signal strength may depend on the frequency with which the data is collected. For instance, cell location and signal strength data may be assigned a relevancy of "medium" if one sample is collected per day and a relevancy of "high" if more than one sample is collected per day. For example, each sample may indicate cell location and signal strength information for the device during business hours (e.g., Monday through Friday and 10:00 AM through 5:00 PM) and from the same cell location with the highest signal strength.

In this example, the relevance of geolocation data such as latitude and longitude information may depend on factors such as the accuracy range of the data sample, the time in which the data sample is collected, and the frequency with which the data is sampled. For instance, the highest relevancy may be assigned to geolocation data in which more than one sample is collected per day between 10:00 AM and 5:00 PM local time and with an accuracy of better than a 0.25 mile radius. A "high" relevancy level may be assigned to data in which one sample per day is collected on Monday through Friday, 10:00 AM through 5:00 PM local time, with an accuracy of better than a 0.25 mile radius. A "high" relevancy level may also be assigned to data in which more than one sample per day is collected on Monday through Friday, 7:00 AM through 7:00 PM local time, with an accuracy of better than a 0.025 mile radius. A "medium" relevancy level may be assigned to data collected once per week, Monday through Friday, between 7:00 AM and 7:00 pm local time. A "low" relevancy level may be assigned to data sampled once per month, Monday through Friday, between 7:00 am and 7:00 pm local time, with the oldest sample being less than three months old. The lowest relevancy score may be assigned to data sampled once every three months, Monday through Friday, between 9:00 am and 6:00 pm local time, with an accuracy range of better than a 0.25 mile radius.

As described with respect to the preceding example, in some embodiments different data may be collected for different data types. The second instruction may designate one or more operations for assigning relevancy scores to the collected data based on various factors. Alternately, or additionally, the second instruction may designate one or more operations for using the collected data to draw inferences about the device and/or the user of the device. The raw data, the relevancy scores, and/or the inferences drawn from the raw data and/or relevancy scores may be transmitted to a remote server for processing and/or storage.

At 308, a third instruction for transmitting audience data is identified. According to various embodiments, the third instruction may indicate when data at the client device is to be scheduled for transmission to a remote server such as the data aggregation server 208 shown in FIG. 2. For instance, the third instruction may indicate that aggregated data is to be transmitted to the remote server on a daily or weekly basis.

In particular embodiments, the third instruction may indicate which type or types of data are to be scheduled for transmission to the remote server. For instance, the third instruction may indicate that raw data, summary data, analyzed data, or some combination thereof is to be scheduled for transmission to the remote server.

At 310, one or more client devices associated with the designated advertising context are identified. According to various embodiments, the one or more client devices may include devices that meet the one or more criteria identified in operation 304. For example, the one or more devices may have installed a particular application linked with the presentation of advertisements. As another example, the one or more devices may be devices in communication with a given website.

In particular embodiments, the one or more client devices may be identified by communication between the client devices and the server. For example, when an application associated with online advertisement is installed on a mobile device, the application may cause the device to transmit an instruction to the server indicating that the application has been installed. Likewise, when an application is opened or used at the client device, the application may cause the device to transmit an instruction to the server indicating opening of the application. As another example, when a web browser at a client device visits a webpage, the client device and/or the webpage server may transmit a message to the configuration server to configure audience data collection at the client device.

At 312, the identified instructions are transmitted to the identified one or more devices. According to various embodiments, the identified instructions may be transmitted via one or more networks. For instance, the instructions may be transmitted via a mobile telephone network, via a public network such as the internet, or via any other type of network.

In particular embodiments, the identified instructions may be transmitted to the client device via a push framework, a pull framework, or any other communication technique. For instance, in a push framework, the transmission of the instructions to the client device may be initiated by the server. In a pull framework, the client device may initiate the transmission upon request, for instance on a periodic basis.

In particular embodiments, the technique for transmitting the identified instructions to the client device may vary depending on the advertising context. For example, if the advertising context involves a web browser visiting a website, then the identified instructions may be transmitted to the client device as JavaScript or other computer code along with the website. As another example, if the advertising context involves a web-enabled application installed on the client device, then the instructions may be transmitted directly to the web-enabled application.

Figure 4:
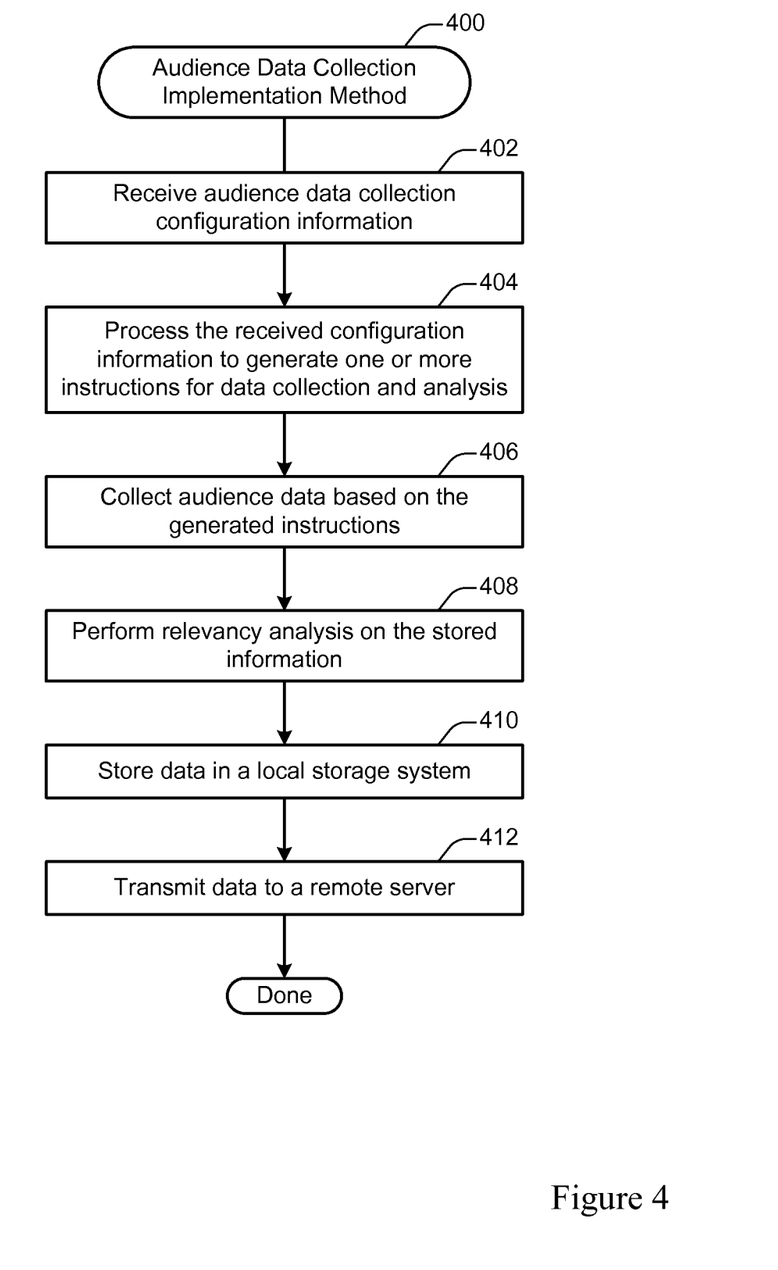
FIG. 4 illustrates an example of an audience data collection implementation method performed in accordance with one or more embodiments.

FIG. 4 illustrates an example of an audience data collection implementation method 400 performed in accordance with one or more embodiments. According to various embodiments, the method 400 may be performed on a client device in communication with one or more remote servers. For instance, the method 400 may be performed on the client device 204 shown in FIG. 2.

In particular embodiments, the method 400 may be performed periodically, upon request, or at scheduled times. For instance, the method 400 may be performed daily or when new configuration information is received from a remote server.

At 402, audience data collection configuration information is received. According to various embodiments, the audience collection configuration information received at operation 402 may include the information transmitted at operation 312 shown in FIG. 3. For instance, the audience collection configuration information may include one or more instructions for collecting, processing, and/or transmitting audience data at the client device.

According to various embodiments, as discussed with respect to operation 312, the configuration information may be transmitted to the client device in various ways. For instance, the information may be transmitted via one or more networks using a push or pull communications framework.

At 404, the received configuration information is processed to generate one or more instructions for data collection and analysis. According to various embodiments, the generation of instructions for data collection and analysis may be performed by a component such as the configuration module 210 shown in FIG. 2. The configuration module may server as an engine that interprets or compiles the configuration information received from the remote server to generate the instructions.

According to various embodiments, the operations used to generate the instructions for data collection and analysis may depend on factors such as the advertising context in which the data collection is performed. For instance, in the context of an advertising analysis embedded in an application installed on the device, the instructions may be generated by an interpreter or compiler included as a module within the application. In the context of a visit to a website by a web browser installed on the device, the instructions may be generated by a script interpreter such as a JavaScript interpreter associated with the web browser.

At 406, audience data is collected based on the generated instructions. According to various embodiments, collecting the audience data may involve any operations for analyzing the device to identify and isolate the audience data. For example, the device may provide access to an API for retrieving information such as a device identifier, operating system version, carrier identifier, or manufacturer identifier. As another example, the device may provide access to an API for retrieving hardware information associated with the device such as an amount of battery remaining, an indication of wireless signal strength, or other such hardware data. As yet another example, the device may provide access to an API for retrieving communications metadata such as a number of text messages or phone calls sent or received, an identifier for a WiFi access point or cellular tower, geolocation coordinates, or other such communications metadata.

In particular embodiments, the collection of audience data may involve the retrieval of previously stored audience data. For instance, data such as device carrier or geolocation coordinates may be collected and stored on a periodic basis. This data may be retrieved for the purpose of performing relevancy analysis and/or for transmission to a remote server.

At 408, relevancy analysis is performed on the stored information. According to various embodiments, the relevancy analysis may be performed in accordance with the instruction identified at operation 306 discussed with respect to FIG. 3. For instance, the relevancy analysis may compute relevancy scores for data collected in operation 406. The data may be combined and processed to draw one or more inferences regarding the device and/or a user of the device.

In particular embodiments, the relevancy of data to the drawing of inferences may depend on any of various factors. For example, the relevancy of a data type decreases as the number of samples within a given period of time decreases. As another example, the relevancy of a data sample decreases as the data sample ages. As yet another example, the relevancy of a data attribute group decreases as the number of attributes in the group for which data has been collected decreases. As still another example, the relevancy of data may depend on factors such as the frequency of sample collection, the strength or quality of the data, and the importance of the data to a particular inference or attribute group.

For example, relevancy analysis may be used to determine that a user most likely works in a particular city. In this example, three geolocation data samples that map to an address within the city may be collected during business hours over the course of several weeks. Also, two cell location data samples that identify a strong signal in communication with cell towers within the city may be collected over the course of a week. In addition, the device may report a sufficient number of country and carrier codes (e.g., USA and AT&T) consistent with the identification of the city.

According to various embodiments, various types of inferences may be drawn based on the data collected at the device. For example, it may be estimated that a user of the device works in Redwood City, Calif, that the user commutes via public transportation, that the user is interested in the "pop" music genre, and that the user frequently sends texts messages.

In particular embodiments, a relevancy score may be assigned to the inference. For example, an inference may be assigned a relevancy score that is determined by aggregating the relevancy scores of the data used to determine the inference. In this way, a relevancy score may in some instances change over time. For instance, if the relevancy scores of the data used to form the inference decreases due to aging or other factors, the relevancy score may decrease. Alternately, if improved data that supports the inference is identified, then the relevancy score for the inference may increase over time.

At 410, data is stored in a local storage system. According to various embodiments, the stored data may include various types of information associated with the device. For example, the stored data may include any or all of the audience data collected at operation 406. As another example, the stored data may include any or all of the results of the relevancy analysis performed at operation 408. In some instances, data may be deleted or moved to an archived storage system as the data ages since more recent data may be more relevant than older data for drawing inferences regarding the client device and/or a user associated with the client device.

At 412, data is transmitted to a remote server. According to various embodiments, the data may be transmitted in accordance with the instruction identified as discussed with respect to operation 308 in FIG. 3. For example, the instruction may designate a frequency or a schedule for transmitting information. As another example, the instruction may designate which information to transmit to the server. As yet another example, the instruction may designate a remote server to which to transmit the data.

According to various embodiments, various types of data may be transmitted to the remote server. For example, the data transmitted to the remote server may include any or all of the audience data collected at operation 406. As another example, the data transmitted may include any or all of the results of the relevancy analysis performed at operation 408. As yet another example, the data transmitted may include audience data previously collected and stored on the device and/or analysis data previously generated and stored on the device.

According to various embodiments, not all of the operation shown in FIGS. 1 and 3-5 need be performed in every instance in which the methods shown in these Figures are performed. For example, in the method 400, audience data may be collected, stored, analyzed, and/or transmitted even when new configuration information is not received. For instance, in some systems, data may be collected relatively frequently, such as hourly. However, data analysis may be performed less frequently, such as daily. Configuration information may in some cases be updated even less frequently, such as weekly.

Figure 5:
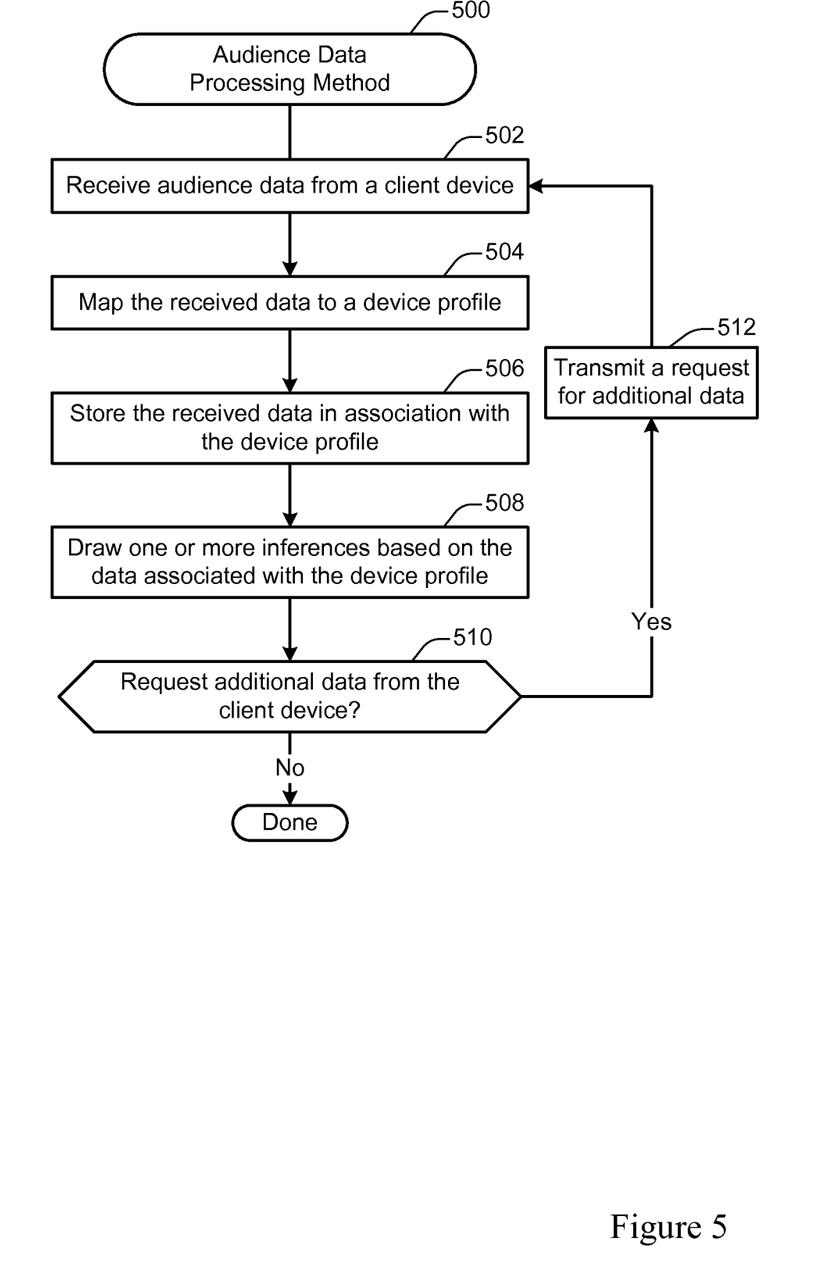
FIG. 5 illustrates an example of an audience data processing method, performed in accordance with one or more embodiments.

FIG. 5 illustrates an example of an audience data processing method 500, performed in accordance with one or more embodiments. The method 500 may be performed at a remote server configured to perform advertising audience data analysis. For instance, the method 500 may be performed at the data aggregation server 208 shown in FIG. 2.

According to various embodiments, the method 500 may be performed periodically, at scheduled times, or upon request. For instance, the method 500 may be performed once per day, or when additional information is received from a client device.

At 502, audience data is received from a client device. According to various embodiments, the audience data may be the information transmitted as discussed with respect to operation 412 shown in FIG. 4. The audience data may identify a particular client device, for instance via a unique identifier associated with the client device. The audience data may include raw data collected at the client device, processed data generated at the client device, inferences drawn at the client device, or any other information.

At 504, the received data is mapped to a device profile. According to various embodiments, the remote server may have access to a storage system in which information associated with different client devices is stored. Mapping the received data to a device profile may involve identifying a device profile for with the client device associated with the data received from the client device. If no device profile exists for the client device, then a new device profile may be created.

At 506, the received data is stored in association with the device profile. According to various embodiments, the device profile may include various types of information associated with the device. For example, the device profile may include any or all of the data received in the past from the client device. As another example, the device profile may include inferences drawn based on past data received from the client device. In some instances, data may be deleted or moved to an archived storage system as the data ages since more recent data may be more relevant than older data for drawing inferences regarding the client device and/or a user associated with the client device.

At 508, one or more inferences are drawn based on the data associated with the device profile. According to various embodiments, the types of inferences drawn by the remote server in operation 506 may be similar in many respects to the relevancy analysis performed at operation 408 shown in FIG. 4. For instance, the types of inferences that may be drawn may include, but are not limited to, estimates of the age, gender, work location, and/or home location of a user associated with the device.

According to various embodiments, new data may be correlated with previously collected data to form behavioral trends over relatively longer periods of time. For instance, the server may have access to stored data that is no longer available on the client device.

At 510, a determination is made as to whether to request additional information from the client device. According to various embodiments, the determination may be made at least in part based on whether the information transmitted from the client device is sufficient to draw inferences as discussed with respect to option 508. For instance, if the audience data transmitted from the client device is assigned a relevancy score below a designated threshold, then additional information may be requested from the client device.

At 512, a request for additional data is transmitted to the client device if it is determined that such a request is suitable. For instance, the request may be transmitted via a network such as the internet and/or a cellular network.

Figure 6:
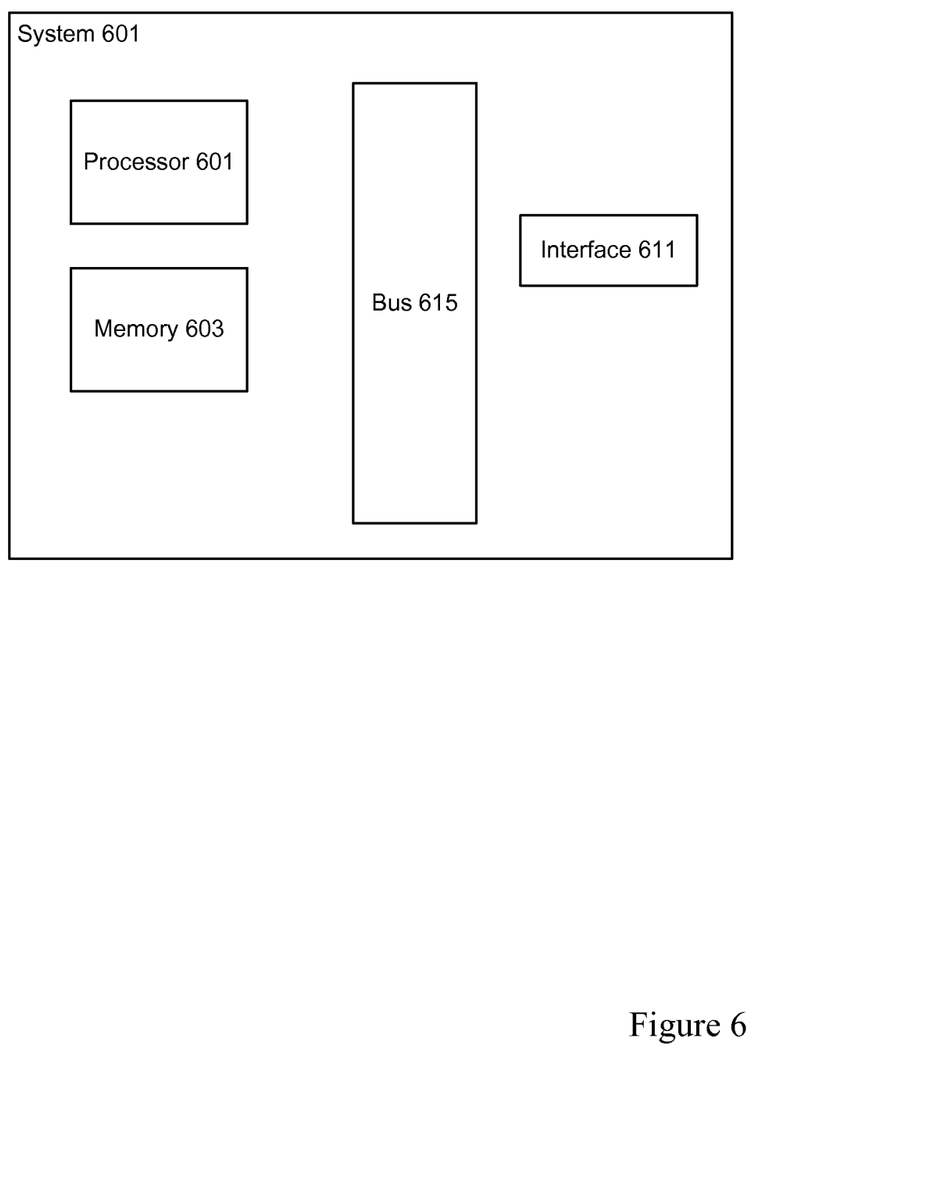
FIG. 6 illustrates an example of a server, configured in accordance with one or more embodiments.

FIG. 6 illustrates one example of a server. According to particular embodiments, a system 600 suitable for implementing particular embodiments of the present invention includes a processor 601, a memory 603, an interface 611, and a bus 615 (e.g., a PCI bus or other interconnection fabric) and operates as a counter node, aggregator node, calling service, zookeeper, or any other device or service described herein. Various specially configured devices can also be used in place of a processor 601 or in addition to processor 601. The interface 611 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
at a configuration server:
generating a data collection configuration message comprising:
a first instruction for identifying data to collect at a mobile computing device, wherein the first instruction designates one or more correlation groups,
wherein each correlation group corresponds to a usage characteristic of a usage pattern and identifies a plurality of data types related by one or more common characteristics,
wherein at least one data type is identified by multiple correlation groups;
a second instruction for analyzing data collected at the mobile computing device to determine relevancy of collected data to the usage pattern based on a plurality of factors; and
a third instruction for transmitting data from the mobile computing device;
identifying the mobile computing device based on receiving, from the mobile computing device, a notification message in response to one or more of the following:
installation of an application at the mobile computing device, operation of the application installed at the mobile computing device, and a request by the mobile computing device to access a website;

transmitting the data collection configuration message to the mobile computing device via data packets over a network in response to receiving the notification message;

at the mobile computing device:

processing the data collection configuration message with a configuration engine to identify the first instruction and write data collection logic to the mobile computing device based on the first instruction, the data collection logic identifying data to collect at the mobile computing device based on one or more correlation groups, wherein the mobile computing device is not previously configured to identify the data to collect;

collecting the identified data as a data sample of collected data via an application programing interface of the mobile computing device;

assigning a group-specific score to the data sample for each correlation group based on relevancy of data types in the data sample to the correlation group;

processing the data collection configuration message with the configuration engine to identify the second instruction and configure the mobile computing device to perform an analysis procedure for determining relevancy of the collected data to the usage pattern at the mobile computing device, wherein the mobile computing device is not previously configured to determine relevancy of the collected data to the usage pattern via the analysis procedure;

analyzing, via the analysis procedure, the collected data by:

assigning one or more relevancy scores to the collected data, each relevancy score indicating the applicability of a data element in the collected data to the usage pattern, generating an inference for the usage pattern based on the one or more relevancy scores and data types in the collected data, and aggregating the one or more relevancy scores to determine an overall relevancy score for the inference; and transmitting the analyzed data to a data aggregation server via data packets over the network in accordance with the third instruction, the analyzed data including the inference for the usage pattern;

at the data aggregation server:

mapping the analyzed data to a device profile associated with the mobile computing device; and storing the analyzed data in association with the device profile.

2. The method recited in claim 1, wherein the collected data includes a plurality of data elements, wherein each of the data elements is related to a usage characteristic, and wherein the usage characteristic is indicative of the usage pattern.

3. The method recited in claim 1, wherein the usage pattern indicates a preference, characteristic, or behavior pattern exhibited by a user associated with the mobile computing device.

4. The method recited in claim 1, wherein at least a portion of the collected data and at least a portion of the analyzed data is temporarily stored on a storage component at the mobile computing device based on predetermined criteria.

5. A system comprising:

a mobile computing device; and an analysis system comprising a configuration server and a data aggregation server;

wherein the configuration server is configured to:

generate a data collection configuration message comprising:

a first instruction for identifying data to collect at the mobile computing device, wherein the first instruction designates one or more correlation groups, wherein each correlation group corresponds to a usage characteristic of a usage pattern and identifies a plurality of data types related by one or more common characteristics, wherein at least one data type is identified by multiple correlation groups;

a second instruction analyzing data collected at the mobile computing device to determine relevancy of collected data to the usage pattern based on a plurality of factors; and a third instruction for transmitting data from the mobile computing device identify the mobile computing device based on receiving, from the mobile computing device, a notification message in response to one or more of the following:

installation of an application at the mobile computing device, operation of the application installed at the mobile computing device, and a request by the mobile computing device to access a website; and transmit the data collection configuration message to the mobile computing device via data packets over a network in response to receiving the notification message;

wherein the mobile computing device comprises a configuration engine configured to:

process the data collection configuration message to identify the first instruction and write data collection logic to the mobile computing device based on the first instruction, the data collection logic identifying data to collect at the mobile computing device based on the one or more correlation groups, wherein the mobile computing device is not previously configured to identify the data to collect; and process the data collection configuration message to identify the second instruction and configure an analysis procedure for determining relevancy of the collected data to the usage pattern at the mobile computing device, wherein the mobile computing device is not previously configured to determine relevancy of the collected data to the usage pattern via the analysis procedure;

wherein the mobile computing device further comprises a processor configured to:

collect the identified data as a data sample of collected data via an application programming interface of the mobile computing device;

assign a group-specific score to the data sample for each correlation group based on relevancy of data types in the data sample to the correlation group;

analyze, via the analysis procedure, the collected data by:
assigning one or more relevancy scores to the collected data, each relevancy score indicating the applicability of a data element in the collected data to the usage pattern,
generating an inference for the usage pattern based on the one or more relevancy scores and data types in the collected data, and
aggregating the one or more relevancy scores to determine an overall relevancy score for the inference; and
transmit the analyzed data to the data aggregation server via data packets over the network in accordance with the third instruction, the analyzed data including the inference for the usage pattern;
wherein the data aggregation server is configured to:
map the analyzed data to a device profile associated with the mobile computing device; and
store the analyzed data in association with the device profile.

6. The system recited in claim 5, wherein the collected data includes a plurality of data elements, wherein each of the data elements is related to a usage characteristic, and wherein the usage characteristic is indicative of the usage pattern.

7. The system recited in claim 5, wherein the usage pattern indicates a preference, characteristic, or behavior pattern exhibited by a user associated with the mobile computing device.

8. One or more computer readable media having instruction stored thereon for performing a method, the method comprising:
at a configuration server:
generating a data collection configuration message comprising:
a first instruction for identifying data to collect at a mobile computing device, wherein the first instruction designates one or more correlation groups,
wherein each correlation group corresponds to a usage characteristic of a usage pattern and identifies a plurality of data types related by one or more common characteristics,
wherein at least one data type is identified by multiple correlation groups;
a second instruction for analyzing data collected at the mobile computing device to determine relevancy of collected data to the usage pattern associated based on a plurality of factors; and
a third instruction for transmitting data from the mobile computing device
identifying the mobile computing device based on receiving, from the mobile computing device, a notification message in response to one or more of the following:
installation of an application at the mobile computing device,
operation of the application installed at the mobile computing device, and
a request by the mobile computing device to access a website;
transmitting the data collection configuration message to the mobile computing device via data packets over a network in response to receiving the notification message;
at the mobile computing device:
processing the data collection configuration message with a configuration engine to identify the first instruction and write data collection logic to the mobile computing device based on the first instruction, the data collection logic identifying data to collect at the mobile computing device based on the one or more correlation groups, wherein the mobile computing device is not previously configured to identify the data to collect;
collecting the identified data as a data sample of collected data via an application programming interface of the mobile computing device;
assigning a group-specific score to the data sample for each correlation group based on relevancy of data types in the data sample to the correlation group;
processing the data collection configuration message with the configuration engine to identify the second instruction and configure the mobile computing device to perform an analysis procedure for determining relevancy of the collected data to the usage pattern at the mobile computing device, wherein the mobile computing device is not previously configured to determine relevancy of the collected data to the usage pattern via the analysis procedure;
analyzing, via the analysis procedure, the collected data to generate analyzed data by:
assigning one or more relevancy scores to the collected data, each relevancy score indicating the applicability of a data element in the collected data to the usage pattern,
generating an inference for the usage pattern based on the one or more relevancy scores and data types in the collected data, and
aggregating the one or more relevancy scores to determine an overall relevancy score for the inference; and
transmitting the analyzed data to a data aggregation server via data packets over the network in accordance with the third instruction, the analyzed data including the inference for the usage pattern;
at the data aggregation server:
mapping the analyzed data to a device profile associated with the mobile computing device; and
storing the analyzed data in association with the device profile.

9. The method recited in claim 1, wherein analyzing the collected data includes classifying at least some of the collected data as private data, wherein private data is not transmitted to the data aggregation server with the analyzed data.

10. The system recited in claim 5, wherein analyzing the collected data includes classifying at least some of the collected data as private data, wherein private data is not transmitted to the data aggregation server with the analyzed data.

11. The one or more computer readable media recited in claim 8, wherein analyzing the collected data includes classifying at least some of the identified data as private data, wherein private data is not transmitted to the data aggregation server with the analyze data.

* * * * *